3,147,506
WIPER ARM-TO-BLADE CONNECTOR SUPPORT
Robert J. Williams, Washington, Mich., assignor to General Motors Corporation, Detroit, Mich., a corporation of Delaware
Filed Apr. 26, 1962, Ser. No. 190,478
4 Claims. (Cl. 15—250.32)

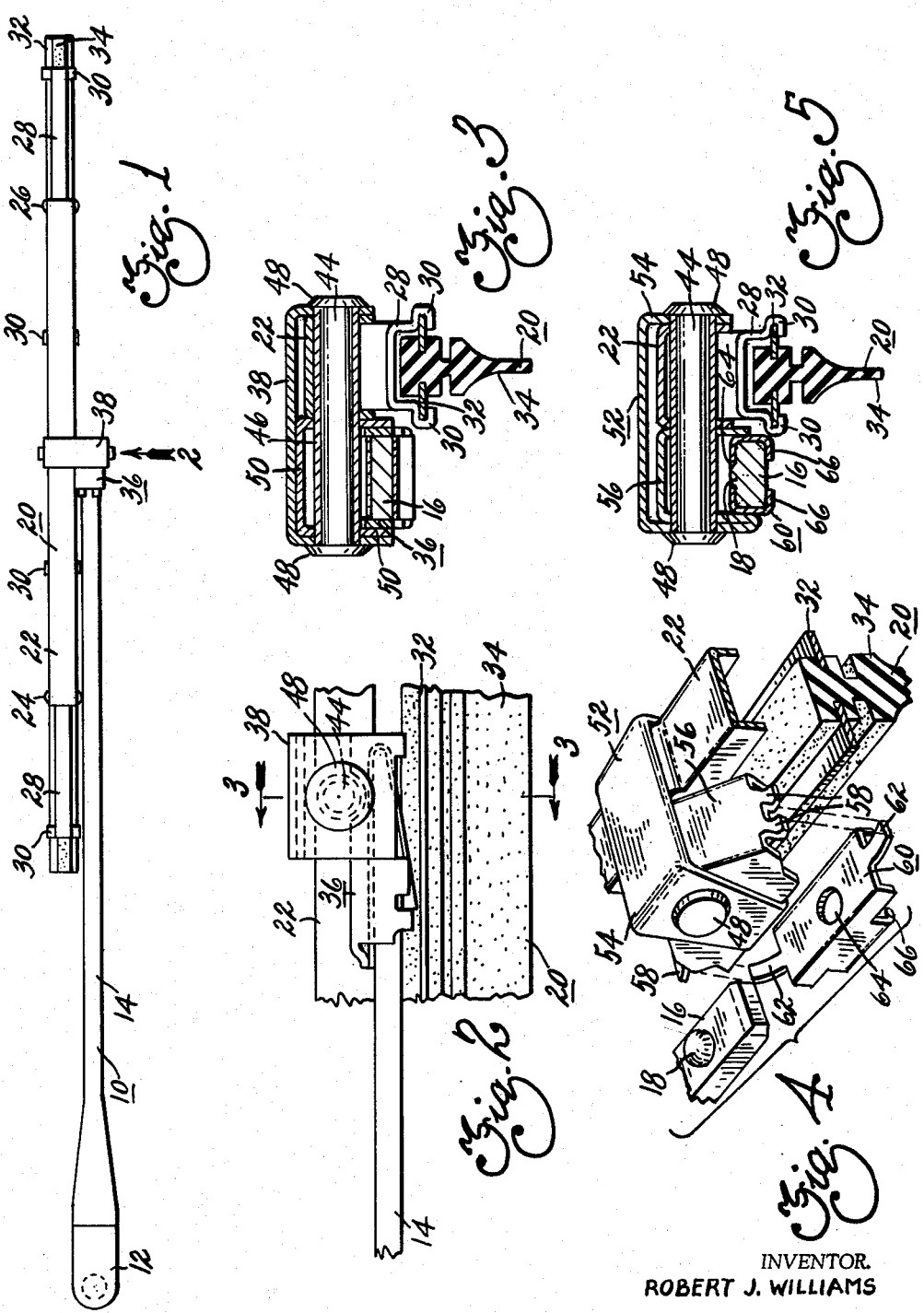

This invention pertains to the art of windshield cleaning, and particularly to an improved connector arrangement between a wiper arm and a wiper blade which results in a low profile.

The majority of present day windshield cleaners comprise a wiper blade and a wiper arm including a bayonet clip pivotally mounted on the wiper blade holder, or superstructure, along an axis transverse to the longitudinal axis of the blade which is adapted to receive a substantially straight end arm having abutment means which are engageable with cooperating abutment means in the connector under spring pressure. Heretofore, it has been customary to pivotally mount the connector so that the socket portion thereof is located above the wiper blade superstructure. This type of arrangement not only results in high torque loads due to the substantial height between the outer end of the wiper arm and the rubber wiping element, but also obstructs vision to some extent when the wiper blades are in their parked positions adjacent the lower reveal molding of the windshield. The present invention relates to an improved, low profile detachable connection between a wiper blade and a wiper arm, and particularly to an improved support for any of the well known type of bayonet connectors.

Accordingly, among my objects are the provision of an improved low profile support for a wiper blade connector; the further provision of a wiper blade connector which is located along one side of the blade holder and pivotally connected thereto; and the still further provision of an improved carrier means for supporting a wiper arm connector in spaced substantially parallel relationship to the retention portion of the wiping element.

The aforementioned and other objects are accomplished in the present invention by pivotally mounting the carrier means on an elongate transverse pin which extends through the blade holder at substantially its center, and supporting the connector in the carrier means in substantially the plane of the retention portion of the wiping element. Specifically, two embodiments of the improved wiper arm-to-blade connector are disclosed herein. In the first embodiment, the carrier member is pivotally connected to the holder and extends laterally to one side thereof. A bracket of inverted channel shape is secured to the laterally extending portion of the carrier member, the bracket carrying a conventional bayonet-type connector. The bayonet-type connector is thus located to one side of the wiping element and in a plane substantially parallel to the retention portion of the wiping element.

In the second embodiment the carrier member includes an integral bracket which supports the bayonet-type connector. In both embodiments the terminal end of the wiper arm, when inserted into the connector, is located in substantially the plane of the retention portion of the wiping element, and is thus appreciably closer to the windshield than with the heretofore conventional arrangement wherein the wiper blade connector is pivotally mounted in superposed relation on the top of the holder. Pivotal movement between the carrier and the holder is limited by engagement of the edges of the carrier with the top wall of the holder thus permitting the wiper blade to tilt about the transverse hinge axis and conform to surfaces of varying inclination and curvature throughout its arc of movement.

Further objects and advantages of the present invention will be apparent from the following description, reference being had to the accompanying drawing, wherein preferred embodiments of the present invention are clearly shown and wherein similar numerals depict similar parts throughout the several views.

In the drawings:

FIGURE 1 is a plan view of a wiper arm and blade assembly including the improved connector means of the present invention.

FIGURE 2 is an enlarged fragmentary view, in elevation, of one embodiment of the improved connector.

FIGURE 3 is a sectional view taken along line 3—3 of FIGURE 2.

FIGURE 4 is an enlarged fragmentary perspective exploded view, partly in section and partly in elevation, of a second embodiment of the improved wiper arm-to-blade connector.

FIGURE 5 is a transverse sectional view of the connector of FIGURE 4.

With particular reference to FIGURE 1, a windshield cleaner assembly is shown comprising a wiper arm 10 and a wiper blade 20. The wiper arm includes a socket, or mounting section, 12 adapted for attachment to a pivot shaft and an outer, or blade carrying, section 14 spring hinge connected to the mounting section 12 for movement about an axis transverse to the longitudinal axis of the arm. The blade carrying section 14 has a flat terminal outer end 16 of rectangular cross-section with an upstanding cylindrical shoulder, or abutment 18, FIGURE 4. The wiper blade 20 comprises a pressure applying superstructure including a primary yoke, or holder, 22 having its opposite ends pivotally connected at 24 and 26 to a pair of secondary yokes 28. The secondary yokes 28 are formed with integral claws 30 at opposite ends which slidably engage the side rails of a flexible backing 32 which carries a rubber wiping element 34.

As alluded to hereinbefore, it has been customary to pivotally attach a connector to the center of the primary yoke, or holder, 22 in superposed relation thereto. In accordance with the present invention the profile of the windshield cleaner assembly is appreciably lowered by disposing the connector 36 along the side of the blade 20 with the connector proper located in substantially the plane of the top, or retention, portion of the wiping element 34. The connector construction, per se, constitutes no part of this invention and may be of any type well known in the art such as disclosed in Patents 2,807,-822 or 2,925,616.

With reference to FIGURES 2 and 3, in one embodiment of the present invention a laterally elongate member, or carrier, 38 is pivotally attached to the central portion of the holder 22 by an elongate pin 44 journalled in a sleeve bearing 46 and having its ends peened at 48. The carrier 38 is of channel shape configuration and has a channel-shaped bracket 50 spot welded thereto in side by side relation to the channel-shaped holder 22. The bayonet connector 36 is attached to the bracket 50 by any suitable means, such as spot welds.

It can be seen that the carrier member 38 is free to pivot about the axis of pin 44 which is transverse to the longitudinal axis of the blade 20 within limits defined by engagement of the edge abutment means of the carrier with the top wall of the holder 22. When the terminal end 16 of the wiper arm is inserted into the connector 36 the outer arm section 14 will be located in substantially the plane of the top of the wiping element 34 and spaced to one side thereof. With the arrangement depicted in FIGURES 1-3, separate left and right hand wiper blade assemblies are required for a windshield cleaning system having a pair of wipers that oscillate conjointly in phase opposition.

With reference to FIGURES 4 and 5 in the second embodiment, a one-piece sheet metal carrier member 52 is utilized. The carrier 52 is formed with a laterally elongate inverted channel-shaped portion 54 and an integral substantially triangular channel-shaped bracket portion 56 having projecting ears 58 which is disposed wholly within the channel-shaped portion 54 and carries a bayonet connector 60. In this embodiment the connector 60 is attached to the triangular portion 54 by interlocking tab portions 62 thereof with the ears 58.

As in the first embodiment, the carrier member 52 is free to pivot about the axes of pin 44 by which it is attached to the holder 22. The bayonet connector 60 has a circular aperture 64 in its top wall for receiving the arm abutment 18, and integral spring fingers 66 for maintaining the abutment 18 interlocked with the aperture 64. With the arrangement depicted in FIGURES 4 and 5, a wiper arm can be inserted into either end of the connector 60, and thus only one wiper blade assembly is required for both the left and right hand sides of a windshield cleaning system having a pair of wipers that oscillate conjointly in phase opposition.

While the embodiments of the invention as herein disclosed constitute preferred forms, it is to be understood that other forms might be adopted.

What is claimed is as follows:

1. A low profile windshield cleaner assembly including, a wiper blade having a wiping element with a retention portion along one edge and a wiping lip along the opposite edge and a holder therefor, a wiper arm, a laterally elongate channel-shaped carrier pivotally attached to said holder for movement about an axis transverse to the longitudinal axis of said blade and having integral abutment means engageable with said holder to limit pivotal movement therebetween, and a blade-to-arm connector attached to said carrier along one side of said wiper blade and lying in substantially the plane of the retention portion of said wiping element.

2. The windshield cleaner assembly set forth in claim 1 wherein a channel-shaped bracket is attached to said carrier, said blade-to-arm connector being attached to said bracket, and wherein the pivotal connection between said carrier and said holder comprises an elongate pin which extends through said carrier, said bracket and said holder.

3. The windshield cleaner assembly set forth in claim 1 wherein said carrier includes an integral substantially triangular channel-shaped bracket portion having ears extending from both ends thereof, and wherein said blade-to-arm connector is attached to said ears.

4. The windshield cleaner assembly set forth in claim 1 wherein said connector is of channel-shape and open at both ends so as to be capable of receiving the terminal end of said wiper arm from either end thereof.

References Cited in the file of this patent

UNITED STATES PATENTS

| 2,852,796 | Leins | Sept. 23, 1958 |
| 2,973,542 | Horton | Mar. 7, 1961 |

FOREIGN PATENTS

| 265,686 | Great Britain | Feb. 10, 1927 |
| 838,419 | Great Britain | June 22, 1960 |